US010222530B2

(12) United States Patent
Schiccheri et al.

(10) Patent No.: US 10,222,530 B2
(45) Date of Patent: Mar. 5, 2019

(54) AUTOMOTIVE LAMP

(71) Applicant: Automotive Lighting Italia S.p.A., Venaria Reale (IT)

(72) Inventors: Nicola Schiccheri, Tolmezzo (IT); Alessandro Buzzurro, Tolmezzo (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 1 day.

(21) Appl. No.: 15/037,141

(22) PCT Filed: Nov. 20, 2014

(86) PCT No.: PCT/IB2014/066204
§ 371 (c)(1),
(2) Date: May 17, 2016

(87) PCT Pub. No.: WO2015/075668
PCT Pub. Date: May 28, 2015

(65) Prior Publication Data
US 2016/0273731 A1  Sep. 22, 2016

(30) Foreign Application Priority Data

Nov. 20, 2013 (IT) .............................. TV2013A0190

(51) Int. Cl.
*F21S 43/239* (2018.01)
*F21V 8/00* (2006.01)
(Continued)

(52) U.S. Cl.
CPC ............ *G02B 6/0018* (2013.01); *F21S 43/14* (2018.01); *F21S 43/239* (2018.01); *F21S 43/243* (2018.01);
(Continued)

(58) Field of Classification Search
CPC ............... F21S 48/2243; F21S 48/2262; F21S 48/2268; F21S 48/2281; F21S 48/215;
(Continued)

(56) References Cited

U.S. PATENT DOCUMENTS

| 2013/0021815 | A1* | 1/2013 | Koizumi | ............... | F21S 48/215 |
| | | | | | 362/511 |
| 2013/0127340 | A1* | 5/2013 | Huhn | ................... | B60Q 1/0041 |
| | | | | | 362/511 |
| 2013/0258705 | A1* | 10/2013 | Pao | ...................... | G02B 6/0023 |
| | | | | | 362/603 |

FOREIGN PATENT DOCUMENTS

| CN | 102865538 A | 1/2013 |
| CN | 102889533 A | 1/2013 |

(Continued)

OTHER PUBLICATIONS

Chinese Notification of First Office Action for Chinese Application No. 201480063830.7 dated Dec. 5, 2017.

*Primary Examiner* — Y M Lee
(74) *Attorney, Agent, or Firm* — McCarter & English, LLP

(57) ABSTRACT

An automotive light is provided that includes a light-guide plate extending inside the rear body of the light remaining substantially parallel to the light reference optical axis close up to the front lenticular hemi-shell of the light with its front side edge facing the strip-shaped transparent or semi-transparent portion of the front lenticular hemi-shell, and a linear-extending light source directing emitted light towards the inside of the light-guide plate through the rear side edge of the same light-guide plate. The rear side edge of the light-guide plate includes a serrated profile with teeth substantially triangular in shape oriented so that a first inclined edge of the tooth is arranged locally substantially perpendicular to the optical reference axis. The light source
(Continued)

includes a row of spaced LEDs facing the rear side edge, each LED facing a respective tooth of the rear side edge so as to direct/project emitted light through the first inclined edge of the tooth. The lighting assembly also includes a series of optical collimators interposed between a diode and a corresponding tooth of the rear side edge of the light-guide plate to deflect light rays towards the corresponding inclined edge of the tooth and collimating the rays in a direction substantially parallel to a collimation axis substantially coplanar to the light-guide plate and inclined with respect to the optical reference axis of the light by greater than 0°.

15 Claims, 5 Drawing Sheets

(51) Int. Cl.
| | | |
|---|---|---|
| *F21V 23/00* | (2015.01) | |
| *F21V 23/04* | (2006.01) | |
| *G02B 27/30* | (2006.01) | |
| *F21S 43/14* | (2018.01) | |
| *F21S 43/243* | (2018.01) | |
| *F21S 43/249* | (2018.01) | |
| *F21Y 101/00* | (2016.01) | |
| *F21Y 115/10* | (2016.01) | |

(52) U.S. Cl.
CPC .......... *F21S 43/249* (2018.01); *F21V 23/005* (2013.01); *F21V 23/04* (2013.01); *G02B 6/003* (2013.01); *G02B 6/0038* (2013.01); *G02B 27/30* (2013.01); *F21Y 2101/00* (2013.01); *F21Y 2115/10* (2016.08)

(58) Field of Classification Search
CPC ............... F21S 48/2212; F21S 48/2225; F21S 48/2231; F21S 43/243; F21S 43/239; F21S 43/249; F21S 43/14; G02B 6/0023; G02B 6/003; G02B 6/0038; G02B 6/0073; G02B 27/30; B60Q 1/2619; B60Q 1/34
See application file for complete search history.

(56) References Cited

FOREIGN PATENT DOCUMENTS

| | | |
|---|---|---|
| CN | 103133958 A | 6/2013 |
| DE | 102006032373 | 1/2008 |
| EP | 2590372 | 5/2012 |
| EP | 2587120 | 5/2013 |
| EP | 2596993 | 5/2013 |

\* cited by examiner

AUTOMOTIVE LAMP

TECHNICAL FIELD

The present invention relates to an automotive light.

More in detail, the present invention relates to an automotive rear light, use to which the following description will make explicit reference without thereby losing generality.

STATE OF THE ART

As known, the automotive rear lights are usually made up of a substantially basin-shaped, rigid rear body which is structured so as to be permanently recessed into a compartment specially made in the rear part of the vehicle body; of a front lenticular hemi-shell which is at least partially made of transparent or semitransparent plastic material, usually also with colored portions, and is arrange to close the mouth of the rear body so as to emerge outside the vehicle body; of one or more incandescent light bulbs, each of which is arranged close to the bottom of the rear body more or less aligned to a corresponding transparent or semitransparent portion of the front lenticular hemi-shell, so as to backlight the same transparent or semitransparent portion of the hemi-shell; and of one or more reflector bodies with a roughly parabolic profile, each one of which is fitted onto a corresponding incandescent light bulb so as to direct the whole light produced by the light bulb towards the superjacent transparent or semitransparent portion of the front lenticular hemi-shell.

In some models of automotive rear lights, moreover, the front lenticular hemi-shell is also provided with a long strip-shaped, transparent or semitransparent portion, usually in yellow color, which extends parallel to the ground; and the automotive light is provided with a row of incandescent light bulbs which are aligned beside to one another beneath the entire strip-shaped transparent or semitransparent portion, so as to backlight each a respective sector of the strip-shaped transparent or semitransparent portion.

Usually the light bulbs arranged beneath the strip-shaped transparent or semitransparent portion are switched on and off with a predetermined frequency, and the resulting intermittent luminous signal is used as a vehicle turning indicator.

During the last years some automotive light manufacturers have thought to replace the row of incandescent light bulbs with an array of light emitting diodes, traditionally called LEDs, which are arranged immediately beneath the corresponding transparent or semitransparent portion of the front lenticular hemi-shell, for the entire extent of the strip-shaped portion.

As known, however, the LEDs are punctiform light sources, thus a large number of LEDs is necessary to evenly backlight the whole strip-shaped transparent or semitransparent portion of the front lenticular hemi-shell. The distribution of the LEDs, in fact, must be such as to produce a light beam which is able to meet the photometrical specifications provided for the approval for vehicle turning indicators, and which also has a light intensity as uniform as possible along the whole extension of the strip-shaped transparent or semitransparent portion of the hemi-shell, thus to satisfy the aesthetic requirements of manufacturers of automobiles, motorcycles and the like.

Unfortunately, the large number of LEDs necessary to optimally backlight the strip-shaped transparent or semitransparent portion of the front lenticular hemi-shell is difficult to be accommodated underneath the front lenticular hemi-shell.

To overcome this drawback, some manufacturers of automotive lights have thought of backlighting the transparent or semitransparent strip-shaped portion of the front lenticular hemi-shell by means of a backlight system made up of a light-guide plate made of photoconductive material and which extends roughly from the bottom of the rear body of the light close up to the lenticular hemi-shell, arranging its front side edge close up to the strip-shaped transparent or semitransparent portion of the front lenticular hemi-shell; and a row of high-power LEDs which is arranged near the bottom of the rear body of light, in abutment on the rear side edge of the light-guide plate, so as to direct the light produced within the light-guide plate through the rear side edge of the same plate. Light that then travels inside the body of the light-guide plate by virtue of the same physical principles governing propagation of light in fiber optic cables, and comes out of the light-guide plate through the front side edge to backlight the strip-shaped transparent or semitransparent portion of the hemi-shell.

SUBJECT OF THE INVENTION

Aim of the present invention is to improve the performance of the backlight system with light-guide plate, so as to increase the intensity and uniformity of the light that comes out from the front side edge of the light-guide plate.

In compliance with the above aims, according to the present invention there is provided an automotive light as specified in claim 1 and preferably, though not necessarily, in any one of the dependent claims.

BRIEF DESCRIPTION OF THE DRAWINGS

The present invention will now be described with reference to the accompanying drawings, which illustrate a non-limitative embodiment, wherein:

FIG. 4 is a sectional view of part of the automotive light shown in FIG. 3; whereas

PREFERRED EMBODIMENT OF THE INVENTION

Figure 1:
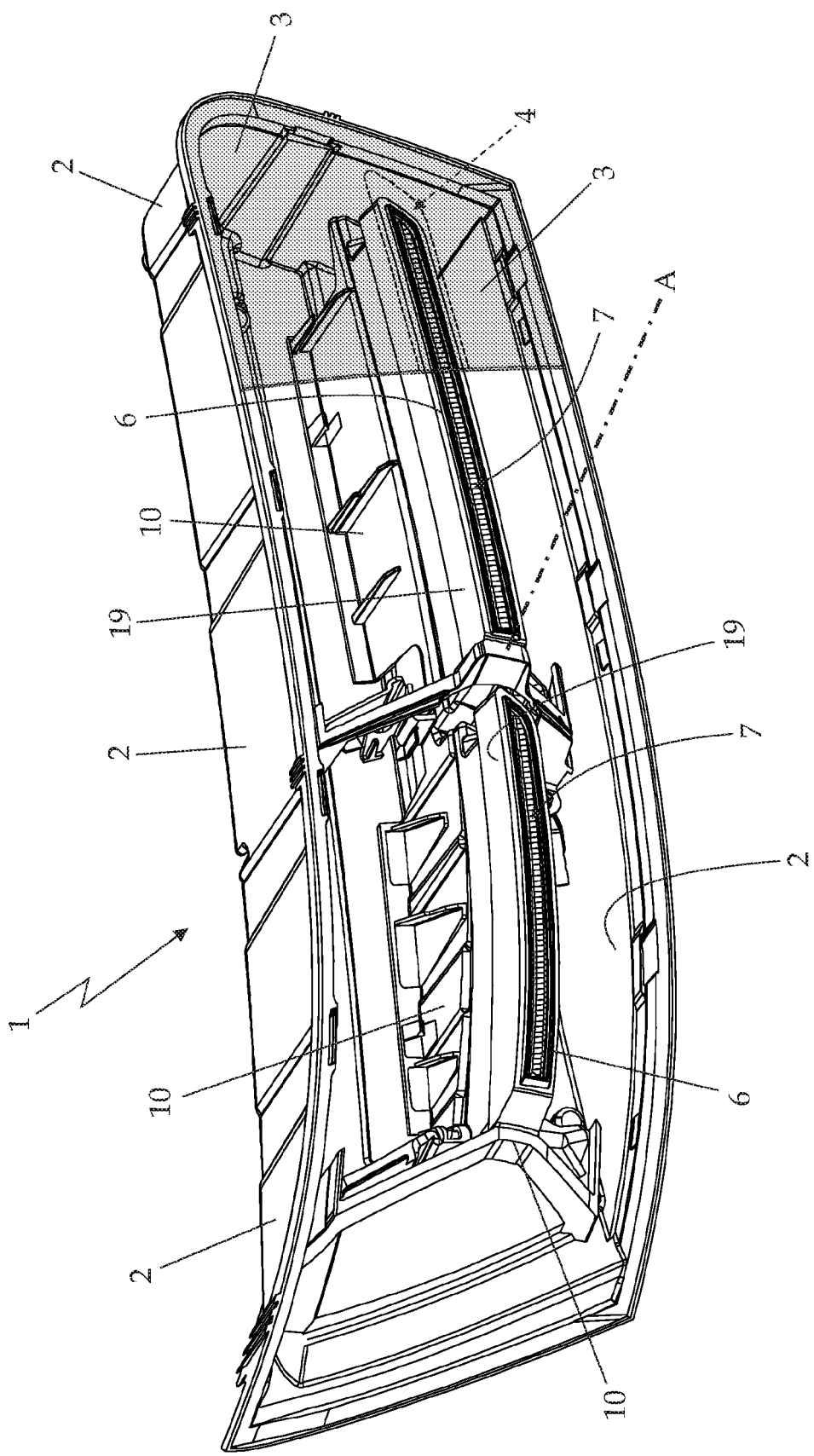
FIG. 1 is an axonometric view of an automotive rear light realized according to the teachings of the present invention, with parts in section and parts removed for clarity.
Figure 2:
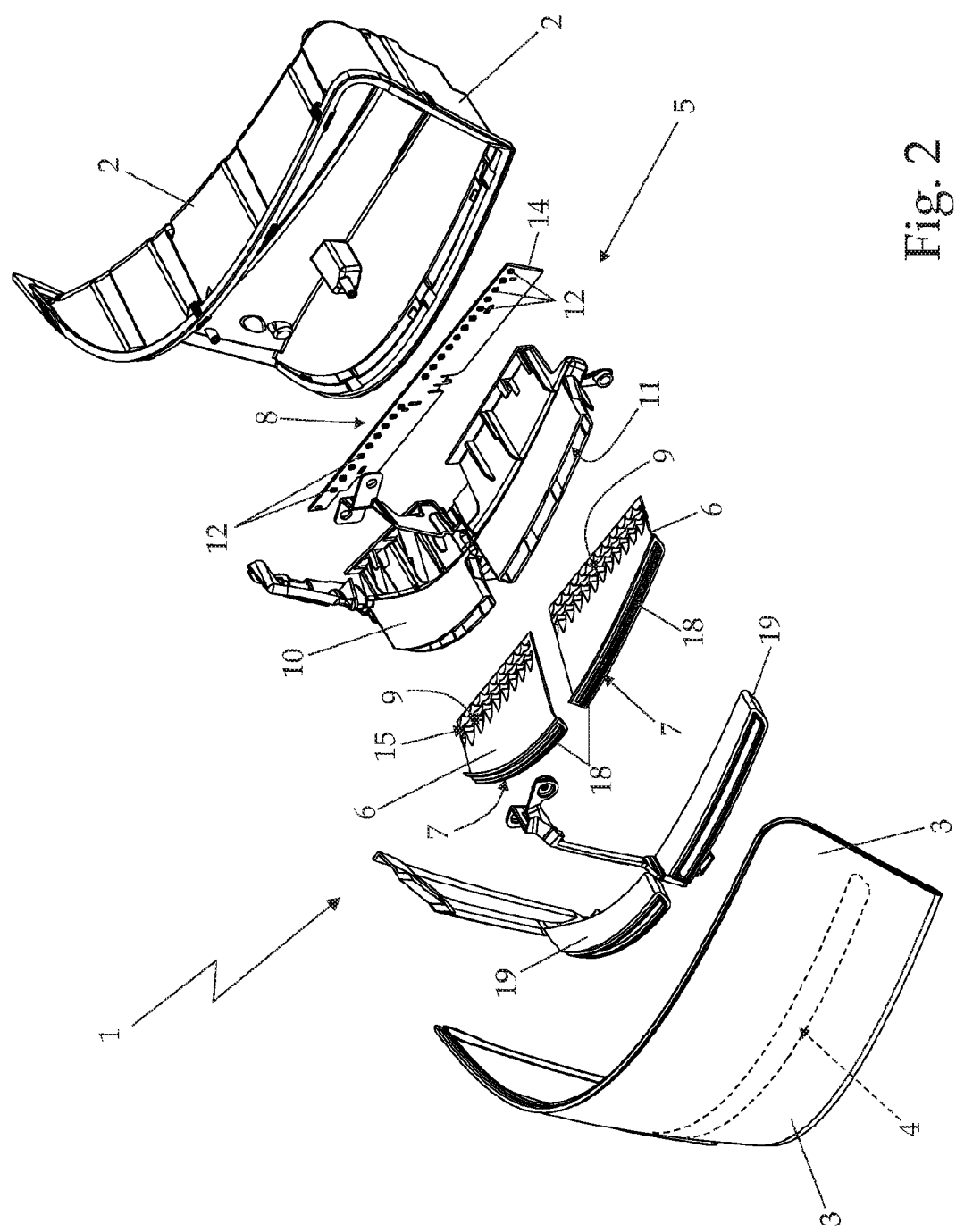
FIG. 2 is an exploded perspective view of the automotive light shown in FIG. 1.

With reference to FIGS. 1 and 2, number 1 indicates as a whole an automotive light particularly suitable to be attached onto the preferably rear part of the vehicle body of a car, van, truck, motorcycle or the like, i.e. an automotive rear light.

More in detail, the automotive light 1 is preferably, though not necessarily, structured to be recessed into the rear part of the vehicle body of a car, motorcycle or similar vehicle, and essentially comprises:

a substantially basin-shaped, rigid rear body 2 which is preferably furthermore structured so as to be recessed into a compartment specially made in the rear part of the vehicle body (not shown);

a front lenticular hemi-shell 3 which is arranged to close the mouth of the rear body 2, preferably, though not necessarily, so as to emerge at the same time towards the outside of the vehicle body (not shown), and is provided with one or more transparent or semitransparent portions, possibly also colored; and one or more lighting assemblies each of which is structured so as to emit light when electricity powered, and is arranged inside the rear body 2 in a position so as to backlight a corresponding transparent or semitransparent portion of the front lenticular hemi-shell 3.

Obviously, in a different embodiment the rear body 2 may also be structured so as to be simply cantilevered attached onto the rear part of the vehicle body (not shown).

Still with reference to FIGS. 1 and 2, at least one of the transparent or semitransparent portions of the front lenticular hemi-shell 3, hereinafter indicated with number 4, is also substantially strip-shaped (i.e. has a narrow and elongated shape), and is preferably arranged on the front lenticular hemi-shell 3 so as to be substantially horizontal when the automotive light 1 fits into the corresponding compartment in the rear part of the vehicle body (not shown).

In the example shown, in particular, the rear body 2 is preferably made of opaque plastic material, preferably via an injection molding process. The front lenticular hemi-shell 3, instead, is preferably made of transparent or semitransparent plastic material, such as for example the transparent or semitransparent polycarbonate or polymethylmethacrylate, also in this case preferably via an injection molding process.

With reference to FIGS. 1, 2, 3 and 4, the lighting assembly suited to backlight the strip-shaped transparent or semitransparent portion 4 of lenticular hemi-shell 3, hereinafter indicated with number 5, is arranged within the rear body 2 immediately below the strip-shaped transparent or semitransparent portion 4, and is provided with a reference optical axis A parallel to which the intensity of the light coming out from the front lenticular hemi-shell 3 preferably assumes the substantially maximum value.

Preferably, moreover, the automotive light 1, as a whole, is structured for being recessed into or mounted on the rear part of the vehicle body (not shown) so that the optical reference axis A of the lighting assembly 5 is preferably, though not necessarily, substantially parallel to the longitudinal axis of the vehicle (not shown).

More in detail, the lighting assembly 5 basically comprises: at least one light-guide plate 6 made of photoconductive material and which extends inside the rear body 2 with the laying plane locally substantially parallel to the optical axis A, close up to the lenticular hemi-shell 3, so as to arrange its front side edge 7 faced to the front strip-shaped transparent or semitransparent portion 4 of the lenticular hemi-shell 3, preferably substantially for the whole length of the strip-shaped portion 4; and a corresponding linear-extending light source 8 which is arranged inside the rear body 2, substantially facing the rear side edge 9 of light-guide plate 6, preferably substantially for the whole length of the rear side edge 9, and is structured and oriented so as to direct the emitted light towards the inside of the light-guide plate 6 through the rear side edge 9 of light-guide plate 6. Light that then travels inside the body of light-guide plate 6 by virtue of the same physical principles governing the propagation of light within optic fiber cables, and comes out from the light-guide plate 5 through the front side edge 7 directed towards the strip-shaped transparent or semitransparent portion 4 of lenticular 3 hemi-shell.

In the example shown, in particular, the lighting assembly 5 is preferably provided with two light-guide plates 6 which are preferably, though not necessarily, made of Plexiglas, transparent polycarbonate or other similar plastic material, preferably via an injection molding process, and are arranged inside the rear body 2 adjacent and substantially coplanar to each other.

Each light-guide plate 6 in addition roughly extends from the bottom of rear body 2 close up to the lenticular hemi-shell 3 while remaining substantially parallel to the optical axis A, so as to have its front side edge 7 facing a corresponding segment/section of the strip-shaped transparent or semitransparent portion 4 of lenticular hemi-shell 3, preferably substantially for the entire length of the same segment/section of strip-shaped portion 4.

Preferably, each light-guide plate 6 also extends inside the rear body 2 close up to the front lenticular hemi-shell 3 while remaining locally substantially perpendicular to the front lenticular hemi-shell 3, and the thickness of light-guide plate 6 is preferably locally substantially equal to the width of the facing segment/section of the strip-shaped transparent or semitransparent portion 4 of front lenticular hemi-shell 3.

Figure 3:
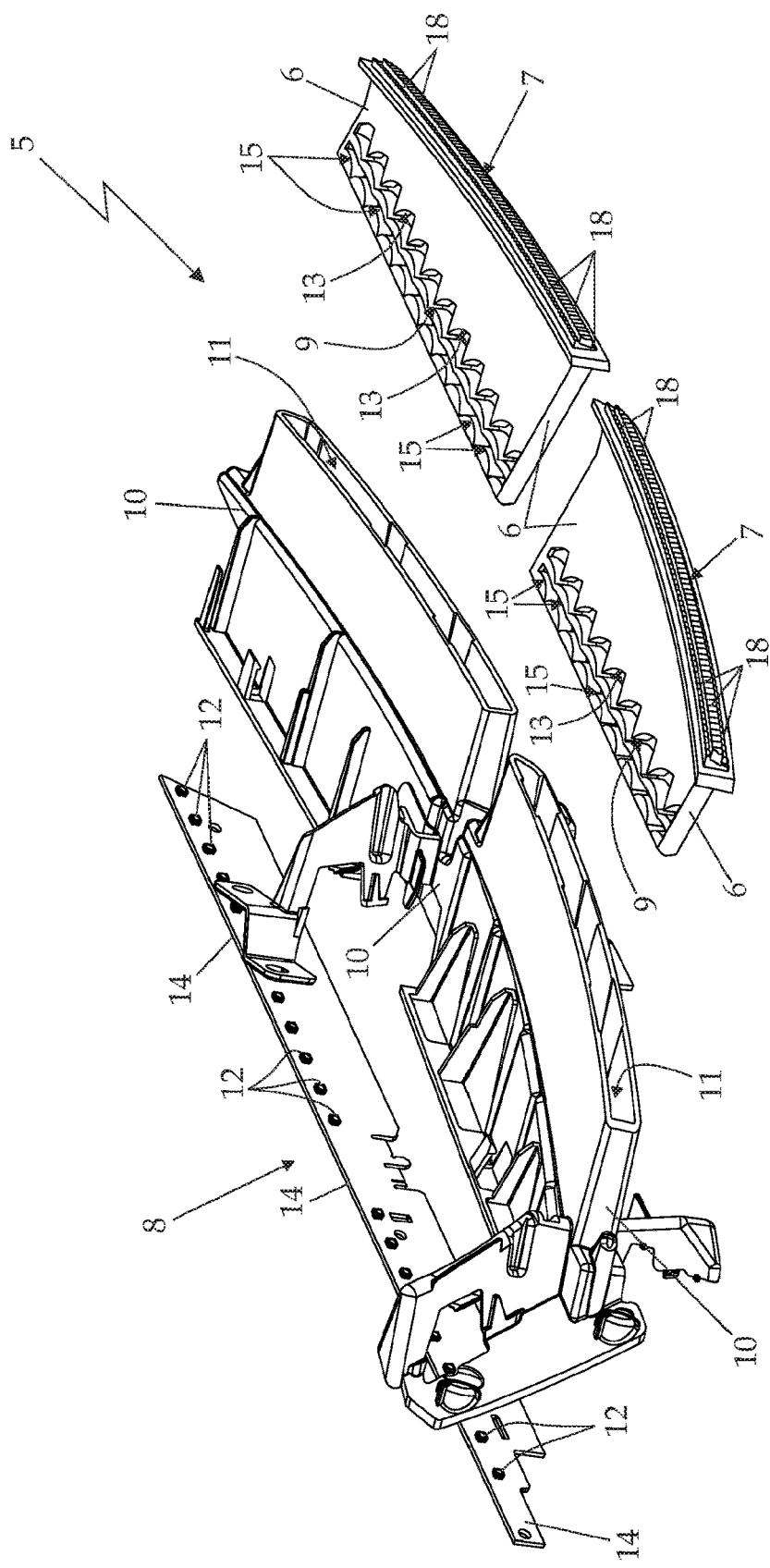
FIG. 3 is an exploded perspective view of a part of the automotive light illustrated in FIGS. 1 and 2.

With reference to FIGS. 1, 2 and 3, in the example shown, in particular, the automotive light 1 is preferably provided with an internal supporting frame 10 which is structured to be preferably wedged or otherwise locked inside rear body 2, beneath the front lenticular hemi-shell 3, and each light-guide plate 6 is fitted/inserted in passing-through manner into a corresponding rigid tubular sleeve 11 incorporated in the supporting frame 10.

The linear-extending light source 8 is instead arranged within the rear body 2, preferably close to the bottom of the rear body 2, in abutment on, or otherwise facing to, the rear side edge 9 of both light-guide plates 6 preferably substantially for the whole length of the rear side edge 9 of both light-guide plates 6, and is structured so as to direct the emitted light towards the inside of both light-guide plates 6 through the rear side edge 9 of the same light-guide plates 6.

Figure 4:
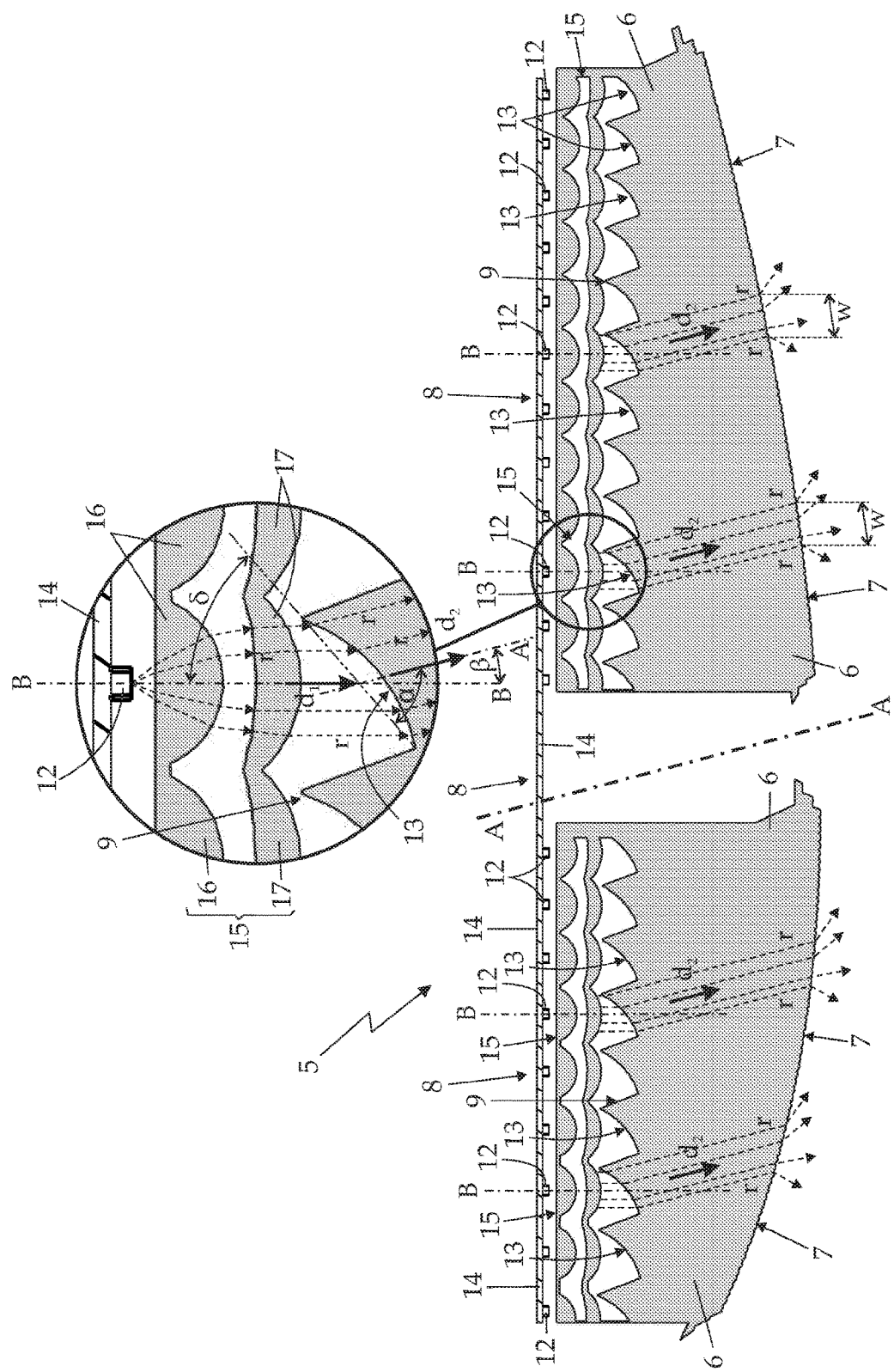

More in detail, with reference to FIGS. 2, 3 and 4, the rear side edge 9 of both light-guide plates 6 has a serrated profile with substantially triangular-shaped teeth, whereas the linear-extending light source 8 comprises a row of light emitting diodes 12, traditionally called LEDs, which are suitably spaced from each other and are arranged in abutment on, or at least faced to, the rear side edge 9 of the two light-guide plates 6, each facing a respective tooth of the overlooking rear side edge 9 of light-guide plate 6, so as to be able to direct/project the emitted light produced towards the inside of the light-guide plate 6 through a dedicated light-entry edge 13 of the same tooth of the rear side edge 9 of light-guide plate 6.

The light-entry edges 13 of the various teeth of the rear side edge 9 of light-guide plate 6 are also oriented so as to be inclined by a preset angle α smaller than 90° with respect to the optical axis A of lighting assembly 5. More in detail, the value of the angle of inclination α preferably, though not necessarily, rages between 35° and 85°.

In the example shown, in particular, the diodes 12 of the linear-extending light source 8 are preferably arranged aligned and spaced beside to one another on a single support board 14 which is preferably arranged close to the bottom of rear body 2, and is oriented so as to have the individual diodes 12 directly in abutment on, or in any case faced to, as many teeth of the rear side edges 9 of the two light-guide plates 6, so that each diode 11 can direct/project the emitted light towards the inside of the respective light-guide plate 6 through the facing light-entry edge 13 of the corresponding tooth of the rear side edge 9 of light-guide plate 6.

Preferably, though not necessarily, the light source 8 also comprises a diode powering and controlling circuit (not shown) which is able to switch on the diodes 12 in a sequential manner, so as to light up in succession the various teeth of the rear side edges 9 of the two light-guide plates 6.

In other words, the diode powering and controlling circuit (not shown) is structured so as to be able to be switched on in succession the individual diodes 12 of the row of light emitting diodes 12 one after the other, starting from one end of the row of diodes 12 and switching on each diode 12 with a predetermined delay (for example 0.1 seconds) with respect to the switching on of the diode 12 immediately adjacent and preceding.

In addition, the diode powering and controlling circuit (not shown) is also structured to switch off each diode 12 of the row of light emitting diodes 12 immediately after switching on the immediately adjacent and successive diode 12.

Alternatively, the diode powering and controlling circuit (not shown) can be structured so as to simultaneously switch off all of the diodes 12 of the row of light emitting diodes 12, with a predetermined delay (for example 0.1 seconds) with respect to the switching on of the last diode 12 of the row of light emitting diodes 12.

In a different embodiment, the diode powering and controlling circuit (not shown) may be structured so as to switch on in succession groups of diodes 12 (for example, three adjacent diodes 12) of the row of light emitting diodes 12 one after the other, starting from one end of the row of diodes 12, and switching on each group of diodes with a predetermined delay (for example 0.1 seconds) with respect to the switching on of the immediately adjacent and preceding group of diodes 12.

Furthermore, the diodes powering and controlling circuit (not shown) could also be structured so to switch off each group of diodes 12 of the row of light emitting diodes 12 immediately after switching on the group of immediately adjacent and successive diodes 12.

Also in this second embodiment, as an alternative, the diode powering and controlling circuit (not shown) could be structured so as to simultaneously switch off all of the group of diodes 12 of the row of light emitting diodes 12, with a predetermined delay (for example 0.1 seconds) with respect to the switching on of the last group of diodes 12 of the row of light emitting diodes 12.

In the example shown, in particular, the diode powering and controlling circuit (not shown) is preferably arranged on the support board 14 together with the diodes 12.

With reference to FIGS. 2, 3 and 4, the lighting assembly 5 is finally provided with a series of optical collimators 15, each of which is interposed between a diode 12 of the light source 8 and the corresponding tooth of the rear side edge 9 of light-guide plate 6, and is structured so as to deflect the light rays r coming out from the diode 12 towards the specific light-entry edge 13 of the corresponding tooth of the rear side edge 9, collimating said light rays in a direction $d_1$ which is locally substantially parallel to a reference axis B that, in turn, is locally substantially coplanar to the light-guide plate 6 and is inclined with respect to the optical axis A of the lighting assembly 5 by an angle β greater than 0°.

The collimation axis B of optical collimator 15 is moreover inclined by an angle δ smaller than 90° with respect to the light-entry edge 13 of the facing tooth of the rear side edge 9 of the light-guide plate 6.

More in detail, with particular reference to FIG. 4, the value of the angle of inclination β of the collimation axis B with respect to the optical axis A and the value of the angle of inclination δ of the collimation axis B with respect to the light-entry edge 13 are chosen so that the light rays r reach the light-entry edge 13 of the tooth with an angle of incidence less than the critical angle thus to penetrate inside the body of light-guide plate 6, and then are refracted towards the front side edge 7 of light-guide plate 6 in a predetermined direction $d_2$ preferably locally substantially parallel to the optical axis A of lighting assembly 5, so as to come out from the light-guide plate 6 through a specific and limited segment w of the front side edge 7 of light-guide plate 6.

The value of the angle of inclination δ of the collimation axis B with respect to the specific light-entry edge 13 is therefore less than 90° and greater than the critical angle associated to the light-guide plate 6, i.e. greater than the angle of incidence above which the light rays arriving on the specific light-entry edge 13 are reflected from the body of the light-guide plate 6.

In the example shown, in particular, the critical angle associated with the constituent material of the light-guide plate 6 is about 43°, thus the value of the angle of inclination δ of collimation axis B with respect to the light-entry edge 13 of the tooth preferably, though not necessarily, ranges between 43° and 75°.

In this way, each diode 12 of the linear-extending light source 8 is capable of forming, on the front side edge 7 of the light-guide plate 6, a respective light segment w with length less than the overall length of the front side edge 7 of light-guide plate 6.

Each diode 12 of the linear-extending light source 8 is therefore able to backlight evenly only a corresponding sector of the strip-shaped transparent or semitransparent portion 4 of the front lenticular hemi-shell 3.

Preferably, though not necessarily, the optical collimator 15 is moreover arranged so that the collimation axis B is eccentric/uncentered with respect to the corresponding tooth of the rear side edge 9 of light-guide plate 6, and preferably centered on the light-entry edge 13 of the tooth. In other words, the tooth on the rear side edge 9 is offset with respect to the collimation axis B of optical collimator 15.

With reference to FIG. 4, in the example shown each optical collimator 15 preferably comprises two converging lenses 16 and 17 which are arranged substantially coaxial to collimation axis B, at a given distance to one another. The optical collimator 15 is also arranged between the diode 12 of the light source 8 and the corresponding tooth of the rear side edge 9 of light-guide plate 6 so that the diode 12 is locally substantially coaxial with the two converging lenses 16 and 17, i.e. coaxial with the collimation axis B.

In the example shown, furthermore, each optical collimator 15 is preferably made in one piece with the light-guide plate 6. In other words, the two converging lenses 16 and 17 of each optical collimator 15 are preferably made in one piece with the light-guide plate 6, preferably, though not necessarily, via an injection molding process.

As concerns the light-guide plates 6, the specific light-entry edge 13 of the teeth of the rear side edge 9 of both light-guide plates 6 has preferably a slightly arched profile, and the collimation axis B of optical collimator 15 is inclined with respect to the cord connecting the two ends of the arched light-entry edge 13, by an angle δ lesser than 90° and greater than the critical angle associated with the constituent material of light-guide plate 6.

In this way, the specific light-entry edge 13 of the tooth on the rear side edge 9 acts as a slightly divergent lens, and the light segment w that each diode 12 form on the front side edge 7 of the light-guide plate 6 is partially overlapped to the light segment w formed by the immediately adjacent diodes 12.

The cord connecting the two ends of the light-entry edge 13 is moreover inclined by an angle α less than 90° and preferably, though not necessarily, comprised between 35° and 85° with respect to the optical axis A of light assembly 5.

With reference to FIGS. 1, 2, 3 and 4, the front side edge 7 of each light-guide plate 6 is instead preferably profiled so as to remain locally substantially tangent to the corresponding segment/section of the strip-shaped transparent or semitransparent portion 4 of lenticular hemi-shell 3, preferably substantially for the whole length of the same portion/section of strip-shaped portion 4.

In addition to the above written, each light-guide plate 6 is preferably also provided with a longitudinal diverging optical system 18 preferably having a substantially cylindrical geometry, which extends along the front side edge 7 of light-guide plate 6, preferably on the laying plane of light-guide plate 6 and preferably also without interruptions substantially for the whole length of front side edge 7, and which is structured so as to diffuse the light rays r that come out from the front side edge 7 of light-guide plate 6.

With reference to FIG. 3, in the example shown, in particular, the front side edge 7 of each light-guide plate 6 is preferably provided with at least one row/succession of lenticular projections of substantially cylindrical geometry (three rows of lenticular projections 18 in the example shown), which are arranged parallel and adjacent to each other along the front side edge 7, preferably on the laying plane of light-guide plate 6 and preferably without interruption along substantially the whole length of front side edge 7, so as to form, on the front side edge 7 of light-guide plate 6, a longitudinal diverging optical system preferably having a substantially cylindrical geometry.

Preferably, the generatrix line or lines of the lenticular projections 18 are also substantially perpendicular, or in any case tilted of a given angle (for example) 60° with respect to the laying plane of light-guide plate 6, so as to form, on the front side edge 7 of light-guide plate 6, a longitudinal diverging optical system 18 preferably having a substantially cylindrical geometry, with the generatrix line or lines locally substantially perpendicular, or in any case tilted of a predetermined angle (for example) 60°, with respect to the laying plane of light-guide plate 6.

In the example shown, in particular, the pitch or distance between two adjacent lenticular projections having a substantially cylindrical geometry 18 preferably, though not necessarily, ranges between 0.01 and 3 mm; while the radius of curvature of the cylindrical profile of each lenticular projections 18 is preferably lesser than twice the value of the pitch or distance between two lenticular projections 18.

With reference to FIGS. 1 and 2, in addition to the strip-shaped transparent or semitransparent portion 4, in the example shown the front lenticular hemi-shell 3 is preferably furthermore provided with two further transparent or semitransparent portions (not shown) that are arranged on the front lenticular hemi-shell 3 on opposite sides of the strip-shaped transparent or semitransparent portion 4; and the automotive light 1 is provided with further two lighting assemblies (not shown) that are arranged inside the rear body 2, each beneath a respective transparent or semitransparent portion, and are structured so as to separately backlight these further transparent or semitransparent portions.

With reference to FIGS. 1 and 2, preferably the automotive light 1 also comprises a cover mask 19 preferably made of an opaque material and which is fitted on the front side edge 7 of both light-guide plates 6, immediately underneath the front lenticular hemi-shell 3, and is structured so as to hide the edge of internal supporting frame 10 and the two light-guide plates 6.

General operation of automotive light 1 is easily inferable from the above described and does not require further explanation.

As regards instead the lighting assembly 5, the tilt between the collimation axis B of optical collimator 15 and the light-entry edge 13 of the corresponding tooth of the rear side edge 9 of light-guide plate 6, allows to use the body of the tooth as a prism, thus each diode 12 is able to produce, on the front side edge 7 of light-guide plate 6, a light segment w of given length and with substantially homogeneous light intensities.

By appropriately spacing the teeth on the rear side edge 9 of light-guide plate or plates 6, it is therefore possible to obtain, on the front side edge 7 of light-guide plate 6, a succession of contiguous and consecutive light segments w of nominal length preferably substantially constant.

The light that comes out from each light segment w moreover has a substantially constant intensity along the whole extension of the same light segment w, thus each diode 12 of the light source 8 can backlight in an uniform manner a corresponding sector of the facing strip-shaped transparent or semitransparent portion 4 of front lenticular hemi-shell 3.

In addition the longitudinal diverging optical system 18 on the front side edge 7 of light-guide plate 6 allows to eliminate/minimize the effects of light concentration typical of punctiform light sources such as the LEDs.

Consequently, the sequential switching on of the row of diodes 12 is able to produce, on the front lenticular hemi-shell 3, a small bright area/spot that travels/moves along the front lenticular hemi-shell 3 parallel to the ground, with the modalities provided for the vehicle turning indicators.

The advantages related to the particular structure of the lighting assembly 5 are considerable.

The particular serrated profile of the rear side edge 9 of light-guide plate 6 and the particular structure of the lighting assembly 5 allow to backlight the strip-shaped transparent or semitransparent portion 4 of front lenticular hemi-shell 3 with a lower number of diodes 12 with respect to the current known systems, furthermore obtaining a much more uniform distribution of light, with all advantages that this implies on the quality of the backlighting of the strip-shaped transparent or semitransparent portion 4.

In addition, the presence of the optical collimator 15 allows the use of all the light emitted by the LED to create the light segment W without dispersion inside the plate.

Last, but not least, when provided with the diode powering and controlling circuit, the lighting assembly 5 is able to produce, on the front lenticular hemi-shell 3, a small bright area/spot particularly homogeneous and bright, which is able to travel/move along the lenticular hemi-shell 3 parallel to the ground, using a reduced number of diodes 12, with all the economic advantages that this entails.

Clearly, changes and variations may be made to the above-described automotive light 1 without, however, departing from the scope of the present invention.

Figure 5:
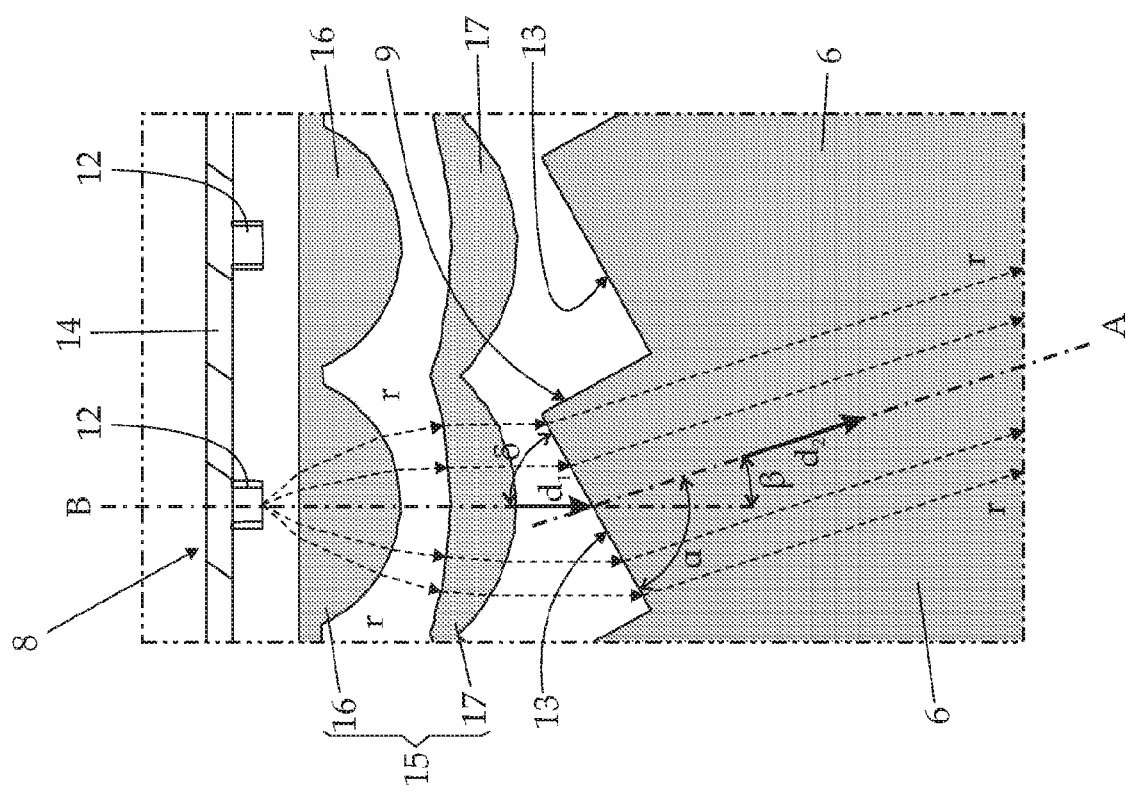
FIG. 5 is a sectional view of a different embodiment of the automotive light part shown in FIG. 3.

With reference to FIG. 5, in a less sophisticated embodiment, the light-entry edge 13 of each tooth of the rear side edge 9 of light-guide plate 6 is substantially rectilinear, and the middle point of the same light-entry edge preferably lies on the collimation axis B of optical collimator 15.

The invention claimed is:

1. An automotive light (1) comprising a substantially basin-shaped rear body (2) structured so to be fixed onto a vehicle body; a front lenticular hemi-shell (3) which is arranged to close a mouth of the rear body (2), and is provided with at least one strip-shaped, transparent or semi-transparent portion (4); and at least a first lighting assembly (5) which is structured so as to emit light when electricity powered, and is arranged within the rear body (2) so as to backlight the strip-shaped, transparent or semi-transparent portion (4) of the front lenticular hemi-shell (3);

the lighting assembly (5) comprising at least one light-guide plate (6) made of photoconductive material and which extends inside the rear body (2) close up to the front lenticular hemi-shell (3) while arranging its front side edge (7) faced to the strip-shaped transparent or semi-transparent portion (4) of the front lenticular hemi-shell (3), and a corresponding linear-extending light source (8) which is arranged inside the rear body (2) and is structured so as to direct the emitted light towards the inside of said light-guide plate (6) through a rear side edge (9) of the same light-guide plate (6);

the linear-extending light source (8) comprising a row of light emitting diodes (12) which are spaced with respect to one another and face the rear side edge (9) so as to direct/project the emitted light towards the inside of the light-guide plate (6);

wherein the rear side edge (9) of said at least one light-guide plate (6) has a serrated profile with teeth substantially triangular in shape; wherein each light emitting diode (12) faces a respective tooth of the rear side edge (9), so as to direct/project the emitted light towards the inside of the light-guide plate (6) through a specific light entry edge (13) of the tooth; wherein an optical collimator (15) is interposed between each light emitting diode (12) of the linear-extending light source (8) and the corresponding tooth of the rear side edge (9) of the light-guide plate (6); and wherein said optical collimator (15) is structured so as to collimate the light rays (r) emitted by the diode (12) in a first direction ($d_1$) which is locally substantially parallel to a collimation axis (B) inclined with respect to the light-entry edge (13) of the tooth by an angle ($\delta$) less than 90° and greater than the critical angle associated to the light-guide plate (6).

2. Automotive light according to claim 1, wherein the angle of inclination ($\delta$) of the collimation axis (B) with respect to the light-entry edge of the tooth (13) is such that the light rays (r) reach the light-entry edge of the tooth (13) with an angle of incidence such as to be refracted towards the front side edge (7) of the light-guide plate (6) in a second direction ($d_2$) locally substantially parallel to a given optical reference axis (A) inclined with respect to the lighting assembly.

3. Automotive light according to claim 1, wherein the collimation axis (B) is locally substantially coplanar to said light-guide plate (6).

4. Automotive light according to claim 1, wherein the optical collimator (15) is arranged so that its collimation axis (B) is eccentric/uncentered with respect to the corresponding tooth of the rear side edge (9) of the light-guide plate (6).

5. Automotive light according to claim 1, wherein the optical collimator (15) is arranged so that its collimation axis (B) is centred on the light-entry edge (13) of the tooth.

6. Automotive light according claim 1, wherein the optical collimator (15) comprises two converging lenses (16, 17) which are arranged substantially coaxially to the collimation axis (B), at a given distance from each other.

7. Automotive light according to claim 6, wherein the optical collimator (15) is arranged between the diode (12) of the light source (8) and the corresponding tooth of the rear side edge (9) of the light-guide plate (6), so that the diode (12) is locally substantially coaxial with said converging lenses (16, 17).

8. Automotive light according to claim 1, wherein each optical collimator (15) is made in one piece with the light-guide plate (6).

9. Automotive light according to claim 1, wherein the light-entry edge of the tooth (13) has an arched profile, and the chord connecting the two ends of the arched light-entry edge (13) is inclined with respect to the collimation axis (B) by an angle less than 90°.

10. Automotive light according to claim 1, wherein the front side edge (7) of said at least one light-guide plate (6) is profiled so as to remain locally substantially tangent to the strip-shaped transparent or semi-transparent portion (4) of the front lenticular hemi-shell (3).

11. Automotive light according to claim 1, wherein said at least one light-guide plate (6) is also provided with a longitudinal diverging optical system (18) which extend along the front side edge (7) of the plate, and is structured so as to scatter the light rays (r) coming out from the front side edge (7) of the light-guide plate (6).

12. Automotive light according to claim 10, wherein said longitudinal diverging optical system (18) is a longitudinal diverging optic system having a substantially cylindrical geometry, with the generatrix line(s) inclined with respect to the plane of the light-guide plate (6).

13. Automotive light according to claim 1, wherein the linear-extending light source (8) additionally comprises a diodes powering and controlling circuit which is able to switch on said diodes (12) in a sequential manner, so as to light up in succession the various teeth of the rear side edge (9) of said at least one light-guide plate (6).

14. Automotive light according to claim 1, wherein the lighting assembly (5) has an optical reference axis (A) parallel to which the intensity of the light emitted from the front lenticular hemi-shell (3) reaches substantially the maximum value, and the light-entry edges (13) of the teeth present on the rear side edge (9) of the light-guide plate (6) are inclined with respect to said optical reference axis (A) by a pre-set angle ($\alpha$) less than 90°.

15. Automotive light according to claim 1, wherein the angle of inclination ($\delta$) between the axis of collimation (B) and the light-entry edge (13) of the tooth on the rear side edge (9) of the light-guide plate (6) is less than 90° and greater than 43°.

* * * * *